US008635206B2

(12) United States Patent
Barbas

(10) Patent No.: US 8,635,206 B2
(45) Date of Patent: Jan. 21, 2014

(54) DATABASE QUERY OPTIMIZATION

(75) Inventor: Pedro M. Barbas, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/173,878

(22) Filed: Jun. 30, 2011

(65) Prior Publication Data

US 2013/0006965 A1 Jan. 3, 2013

(51) Int. Cl.
*G06F 17/30* (2006.01)

(52) U.S. Cl.
USPC .......................................................... 707/713

(58) Field of Classification Search
USPC .................. 707/753–754, 713–714
See application file for complete search history.

(56) References Cited

U.S. PATENT DOCUMENTS

| | | | |
|---|---|---|---|
| 5,598,559 A * | 1/1997 | Chaudhuri | 1/1 |
| 5,659,725 A * | 8/1997 | Levy et al. | 1/1 |
| 6,285,997 B1 | 9/2001 | Carey et al. | |
| 6,691,101 B2 * | 2/2004 | MacNicol et al. | 707/714 |
| 7,167,853 B2 | 1/2007 | Zaharioudakis et al. | |
| 7,379,933 B1 | 5/2008 | Witkowski | |
| 7,440,937 B2 | 10/2008 | Kiernan et al. | |
| 7,440,942 B2 | 10/2008 | Dixon et al. | |
| 7,533,087 B2 | 5/2009 | Liu et al. | |
| 7,562,073 B2 | 7/2009 | Woehler et al. | |
| 7,685,150 B2 | 3/2010 | Manikutty et al. | |
| 7,792,856 B2 | 9/2010 | Fuxman et al. | |
| 8,392,419 B2 | 3/2013 | Heaton et al. | |
| 2002/0198872 A1 * | 12/2002 | MacNicol et al. | 707/3 |
| 2003/0055814 A1 | 3/2003 | Chen et al. | |
| 2006/0265356 A1 | 11/2006 | Kiernan et al. | |
| 2011/0282864 A1 | 11/2011 | Collins et al. | |
| 2011/0314000 A1 * | 12/2011 | Chaudhuri et al. | 707/718 |
| 2013/0006960 A1 | 1/2013 | Barbas | |

OTHER PUBLICATIONS

Akinde, Michael O. et al., "Efficient Computation of Subqueries in Complex OLAP", 19th Intna'l Conf. on Data Engineering(Cat. No. 03CH37405) 2003 , pp. 163-174.
Bellamkonda, Srikanth et al., "Enhanced Subquery Optimizations in Oracle", *VLDB'09; Endowment/ACM* Aug. 24-28, 2009 , 12 pages.
Chaudhuri, Surajit et al., "Optimizing Queries with Aggregate Views", *Advances in Database Technology-EDBT'96; Intna't Conf on Extending Database Technolgy* 1996 , pp. 167-182.
Chen, Dongfeng et al., "Query Optimization using Restructured Views: Theory and Experiments", *IBM TDB 10-88*; pp. 337-342; IP.COM/IPCOM000058418D Oct. 1, 1988 , 36 pages.

(Continued)

*Primary Examiner* — Thu-Nguyet Le
(74) *Attorney, Agent, or Firm* — DeLizio Gilliam, PLLC

(57) ABSTRACT

In some embodiments, a method includes detecting a structured query language (SQL) query. The method can also include determining that the SQL query includes a first sub-query and a second sub-query, wherein the first sub-query and second sub-query are operands for a Union operation, wherein a first result of the first sub-query is associated with a first Group By operation, wherein a second result of the second sub-query is associated with a second Group By operation, and wherein a result of the Union operation is associated with a third Group By operation. The method can also include determining that partitioning columns are the same for the first and second Group By operations; determining that the first and second sub-queries include identical algebraic functions; determining that the first Group By operation and first sub-query are not referenced elsewhere in the SQL query; and transforming the SQL query into an optimized query.

25 Claims, 12 Drawing Sheets

(56) References Cited

OTHER PUBLICATIONS

Copenhaver, M. A. et al., "Interpretive Database Aggregation Operations", *IBM TDB 10-88* IP.COM/IPCOM000058418D Oct. 1, 1988, pp. 337-342.

"U.S. Appl. No. 13/172,094 Office Action", Apr. 11, 2013, 22 pages.

Herodotou, Herodotos et al., "Join Optimization Techniques for Partitioned Tables", VLDB'10, Singapore; Endowment/ACM Sep. 13-17, 2010, 11 pages.

Kim, Won, "Query Optimization for Relational Database System", ip.com/ipcom000151741d; Software Patent Institute (SPI) Oct. 31, 1980, 171 pages.

\* cited by examiner

202

| ORDERS | | | |
|---|---|---|---|
| ORDERID | CUSTOMER | ORDERDATE | SHIPPINGCOST |
| 1 | ABC | 01/01/2007 | 40 |
| 2 | ABC | 01/02/2007 | 30 |
| 3 | ABC | 01/03/2007 | 25 |
| 4 | DEF | 01/02/2007 | 10 |

| ORDERDETAILS | | | |
|---|---|---|---|
| DETAILID | ORDERID | ITEM | AMOUNT |
| 1 | 1 | 100 | 150 |
| 2 | 1 | 150 | 125 |
| 3 | 2 | 125 | 50 |
| 4 | 2 | 50 | 125 |
| 5 | 2 | 300 | 125 |
| 6 | 3 | 300 | 125 |
| 7 | 4 | 300 | 125 |
| 8 | 4 | 300 | 125 |

FIG. 3

| CUSTOMERS 402 ||||
|---|---|---|---|
| CUSTOMER | CUSTOMERNAME | CITY | STATE |
| ABC | ABC | BOSTON | MA |
| DEF | ABC | NEW YORK CITY | NY |

FIG. 4

```
QUERY-1:                                                    502

SELECT Q0.A as Customer, Q0.B as ItemCount, Q0.C as
OrderCount, Q0.D as
TotalShipping
FROM (
SELECT Q1.CUSTOMER AS A, COUNT(*) AS B,
SUM(Q2.AMOUNT) AS C,                                        504
SUM(DISTINCT Q1.SHIPPINGCOST) AS D
FROM ORDERS AS Q1, ORDERDETAILS AS Q2
WHERE (Q1.ORDERID = Q2.ORDERID)
GROUP BY Q1.CUSTOMER
                                                            507
UNION   505

SELECT Q3.CUSTOMER AS A, COUNT(*) AS B,
SUM(Q4.AMOUNT) AS C,
SUM(DISTINCT Q3.SHIPPINGCOST) AS D FROM
ORDERDETAILS AS Q4, ORDERS
AS Q3, customers AS Q5
WHERE Q3.CUSTOMER IS NOT NULL AND (Q3.ORDERID =             506
Q4.ORDERID)
AND (Q3.CUSTOMER = Q5.CUSTOMER)
GROUP BY Q3.CUSTOMER
                                 509
)
AS Q0 GROUP BY Q0.A, Q0.B, Q0.C, Q0.D;
                                                            508
```

FIG. 5

| CUSTOMER | ITEMCOUNT | ORDERCOUNT | TOTALSHIPPING |
|---|---|---|---|
| ABC | 2 | 350 | 10 |
| DEF | 6 | 725 | 95 |

QUERY-2

GRPBY
|
GRPBY
|
SUBQUERY2

```
ORIGINAL STATEMENT (QUERY-1)
SELECT Q0.A AS CUSTOMER, Q0.B AS ITEMCOUNT, Q0.C AS ORDERCOUNT, Q0.D AS
      TOTALSHIPPING
FROM
      (SELECT Q1.CUSTOMER AS A, COUNT (*) AS B, SUM(Q2.AMOUNT) AS C, SUM(DISTINCT
            Q1.SHIPPINGCOST) AS D
      FROM ORDERS AS Q1, ORDERDETAILS AS Q2
      WHERE (Q1.ORDERID = Q2.ORDERID)
      GROUP BY Q1.CUSTOMER
      UNION
      SELECT Q3.CUSTOMER AS A, COUNT(*) AS B, SUM (Q4.AMOUNT) AS C, SUM(DISTINCT
            Q3.SHIPPINGCOST) AS D
      FROM ORDERDETAILS AS Q4, ORDERS Q3, CUSTOMERS AS Q5
      WHERE Q3.CUSTOMER IS NOT NULL AND (Q3.ORDERID = Q4.ORDERID) AND
            (Q3.CUSTOMER = Q5.CUSTOMER)
      GROUP BY Q3.CUSTOMER) AS Q0
GROUP BY Q0.A, Q0.B, Q0.C, Q0.D
```

```
OPTIMIZED STATEMENT (QUERY-1)
SELECT Q14.$C0 AS "CUSTOMER", Q14.$C1 AS " ITEMCOUNT", Q14.$C2 AS "ORDERCOUNT",
      Q14.$C3 AS "TOTALSHIPPING"
FROM
      (SELECT Q13.$C0, Q13.$C1, Q13.$C2, Q13.$C3
      FROM
            (SELECT Q12.$C0, Q12.$C1, Q12.$C2, Q12.$C3
            FROM
                  (SELECT DISTINCT Q11.$C0, Q11.$C1, Q11.$C2, Q11.$C3
                  FROM
                        (SELECT Q4.CUSTOMER, Q4.$C1, Q4.$C2, Q4.$C3
                        FROM
                              (SELECT Q3.CUSTOMER, COUNT(*), SUM(Q3.AMOUNT), SUM (DISTINCT
                                    Q3.SHIPPINGCOST)
                              FROM
                              (SELECT Q1.CUSTOMER, Q2 .AMOUNT, Q1.SHIPPINGCOST
                              FROM SVTDBM8.ORDERS AS Q1, SVTDBM8.ORDERDETAILS AS Q2
                              WHERE Q1.CUSTOMER IS NOT NULL AND (Q1.ORDERID =
Q2.ORDERID))
                                          AS Q3
                              GROUP BY Q3.CUSTOMER) AS Q4
                  UNION ALL
                  SELECT Q9.CUSTOMER, Q9.$C1, Q9.$C2, Q9.$C3
                  FROM
                        (SELECT Q8.CUSTOMER, COUNT(*), SUM Q8.AMOUNT), SUM (DISTINCT
                              Q8.SHIPPINGCOST)
                        FROM
                        (SELECT Q7.CUSTOMER, Q6 .AMOUNT, Q7.SHIPPINGCOST
                        FROM SVTDBM8.ORDERDETAILS AS Q6, SVTDBM8.ORDERS AS Q7
                        WHERE (Q7.ORDERID = Q6.ORDERID)) AS Q8
                        GROUP BY Q8.CUSTOMER) AS Q9) AS Q11) AS Q12) AS Q13
GROUP BY Q13.$C3, Q13.$C2, Q13.$C1, Q13.$C0) AS Q14
```

```
SELECT Q0.A as Customer, Q0.B as ItemCount, Q0.C as OrderCount, Q0.D as
        TotalShipping
FROM
    (SELECT Q3.CUSTOMER AS A, COUNT(*) AS B, SUM(Q4.AMOUNT) AS C, SUM(DISTINCT
            Q3.SHIPPINGCOST) AS D
    FROM ORDERDETAILS AS Q4, ORDERS AS Q3, Customers AS Q5
    WHERE Q3.CUSTOMER IS NOT NULL AND (Q3.ORDERID = Q4.ORDERID) AND
            (Q3.CUSTOMER = Q5.CUSTOMER)
    GROUP BY Q3.CUSTOMER) AS Q0
GROUP BY Q0.A, Q0.B, Q0.C, Q0.D
```

1002

```
SELECT Q6.CUSTOMER AS "CUSTOMER", Q6.$C1 AS " ITEMCOUNT", Q6.$C2 AS
        "ORDERCOUNT", Q6.$C3 AS "TOTALSHIPPING"
FROM
    (SELECT Q5.CUSTOMER, Q5.$C1, Q5.$C2, Q5.$C3
    FROM
        (SELECT Q4.CUSTOMER, Q4.$C1, Q4.$C2, Q4.$C3
        FROM
            (SELECT Q3.CUSTOMER, COUNT(* ), SUM(Q3 .AMOUNT), SUM(DISTINCT
                    Q3.SHIPPINGCOST)
            FROM
                (SELECT Q1.CUSTOMER, Q2 .AMOUNT, Q1.SHIPPINGCOST
                FROM SVTDBM8.ORDERS AS Q1, SVTDBM8.ORDERDETAILS AS Q2
                WHERE Q1.CUSTOMER IS NOT NULL AND (Q1.ORDERID = Q2.ORDERID)) AS
                    Q3
            GROUP BY Q3.CUSTOMER) AS Q4) AS Q5
    GROUP BY Q5.$C3, Q5.$C2, Q5.$C1, Q5.CUSTOMER) AS Q6
```

FIG. 10

DATABASE QUERY OPTIMIZATION

BACKGROUND

Embodiments of the inventive subject matter generally relate to the field of database management systems, and more particularly to tools for optimizing database queries.

Databases management systems (also referred to as database engines or simply DBMSs) often store very large volumes of data, such as employment records, computer logs, or other suitable information. DBMSs typically store this information for use by various software components, such as web servers, application programs, etc. Some DBMSs store information in tables organized in rows and columns. Some DBMSs support complex languages like SQL (Structured Query Language). A DBMS server may receive and process SQL queries that request data. In turn, the DBMS server performs operations defined in the queries, and returns data associated with the queries.

SUMMARY

In some embodiments, a method includes detecting a structured query language (SQL) query. The method can also include determining that the SQL query includes a first sub-query and a second sub-query, wherein the first sub-query and second sub-query are operands for a Union operation, wherein a first result of the first sub-query is associated with a first Group By operation, wherein a second result of the second sub-query is associated with a second Group By operation, and wherein a result of the Union operation is associated with a third Group By operation. The method can also include determining that partitioning columns are the same for the first and second Group By operations; determining that the first and second sub-queries include identical algebraic functions; determining that the first Group By operation and first sub-query are not referenced elsewhere in the SQL query; and transforming the SQL query into an optimized query.

In some embodiments, a method includes detecting a database query, wherein the database query includes a Select operator, and the database query includes a Union operator between a first sub-query and a second sub-query, wherein the first sub-query includes a Group By operation over the first sub-query, and wherein the second sub-query includes a Group By operation over the second sub-query, and wherein the database query includes a Group By operation over both the first and second sub-queries. The method can also include determining that rows of a table in the first sub-query match rows of the table in the second sub-query; determining that the first sub-query and the second sub-query reference identical columns of the table and include identical algebraic functions applied to each column of the table; determining that the first sub-query and the first sub-query's Group By are not referenced elsewhere in the database query; and transforming the database query to an optimized query, wherein the optimized query does not include the Union operator.

BRIEF DESCRIPTION OF THE DRAWINGS

The present embodiments may be better understood, and numerous objects, features, and advantages made apparent to those skilled in the art by referencing the accompanying drawings.

FIG. 2 illustrates the table Orders.
FIG. 3 illustrates the table OrderDetails.
FIG. 4 illustrates the table Customers.
FIG. 5 illustrates a database query—QUERY-1.
FIG. 6 shows results for QUERY-1 and QUERY2.
FIG. 8 shows an organization of QUERY-2.
FIG. 9 shows QUERY-1 as originally written, and after optimized by a query optimizer.
FIG. 10 shows QUERY-2, which is a transformation of QUERY-1.

DESCRIPTION OF EMBODIMENT(S)

Introduction

The following description describes example systems, methods, techniques, instruction sequences and/or computer program products that embody techniques of the present inventive subject matter. However, the described embodiments may be practiced without these specific details. In some instances, for clarity, some well-known instruction instances, protocols, structures, and techniques may not be shown in detail.

Some embodiments of the inventive subject matter relate to DBMSs capable of optimizing queries that include Union operators. Many DBMSs store information in tables that include rows and columns. A query language, such as SQL, is used for writing queries that obtain data stored the tables. SQL allows users to draft a variety of queries for accessing information in databases.

Figure 1:
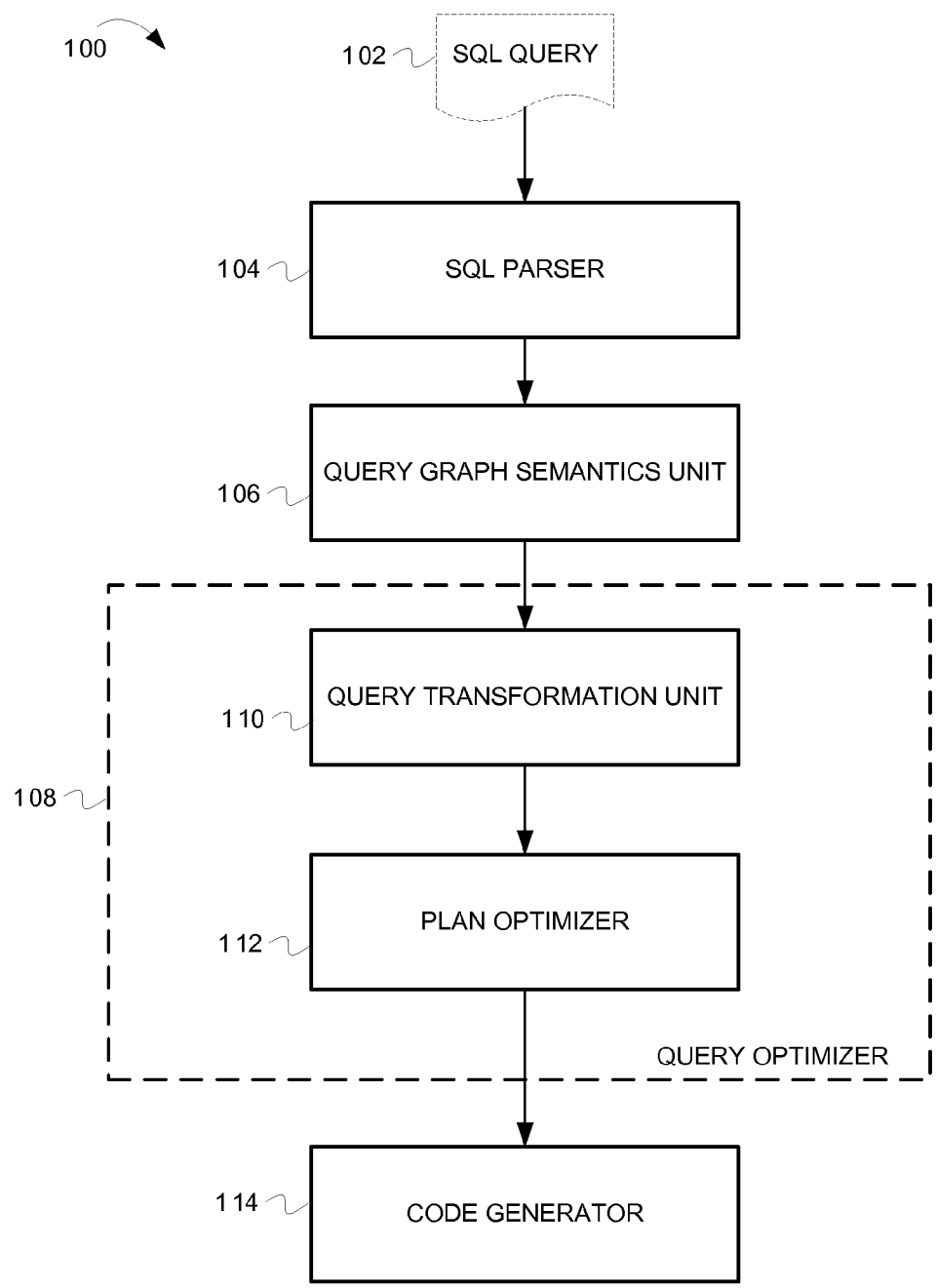
FIG. 1 is a block diagram illustrating components of a DBMS, according to some embodiments of the inventive subject matter.

FIG. 1 is a block diagram illustrating components of a DBMS, according to some embodiments of the inventive subject matter. In FIG. 1, DBMS 100 includes SQL parser 104, query graph semantics unit 106, query optimizer 108, and code generator 114. FIG. 1 shows SQL query 102 moving through DBMS 100. SQL query 102 passes to the SQL parser 104, which parses the query based on a grammar for the SQL language. After parsing query 102, query graph semantics unit 106 further processes query 102 and/or data produced by SQL parser 104.

Query optimizer 108 includes query transformation unit 110 and plan optimizer 112. The query optimizer's query transformation unit 110 transforms queries so they process faster and user fewer resources. Query optimizer 108 can process complex queries designed to extract large amounts of formation in a single query. Such complex queries are commonly inefficient. For example, some complex queries include Union operations of the form: <sub-query1> Union <sub-query2>. In some instances, <sub-query1> can be subsumed by <sub-query2>, where the query result does not use results from <sub-query1> through the Union operation. If the query optimizer 108 does not optimize such a query, the result is a sub-optimal query execution plan that performs unnecessary and duplicative operations and table accesses. However, embodiments of the query optimizer 108 transform queries that include Union operators to be more efficient. The query optimizer's plan optimizer 112 optimizes access plans for queries transformed by the query transformation unit 110. Ultimately, the DBMS's code generator 114 generates code for performing the query, where the code is executable by hardware on which the DBMS 100 operates.

As used herein, reference to a Union operation and Union expression includes other similar operations and expressions, such as Union ALL. For simplicity, the use of the term Union is used hereinafter, but the term includes other suitable Union type expressions and operators.

More Example Embodiments

In some instances, queries include Union operators, where sub-queries of the Union operator match. In these instances, some embodiments employ the following query transformation techniques. Consider the following three tables: Orders, OrderDetails, and Customers. The following SQL code shows how these tables are defined.

```
create table orders
(
orderID integer not null,
customer char(10),
orderDate date,
shippingCost integer,
primary key (orderID)
);
create table orderDetails
(
detailID integer not null,
orderID integer,
item char(10),
Amount integer,
primary key (detailID)
);
create table customers
(
customer char(10) not null,
customerName char(100) not null,
city char(100) not null,
state char(2),
primary key (customer)
);
```

FIG. 2 illustrates the table Orders. Based on the table definitions above, the table Orders contains four columns: orderID, customer, orderDate and shippingCost. FIG. 3 illustrates the table OrderDetails. Based on the table definitions above, the table OrderDetails contains four columns: detailID, orderID, item and Amount. FIG. 4 illustrates the table Customers. The table Customers also contains four columns: Customer, CustomerName, City, and State.

Embodiments of the inventive subject matter transform certain queries to make them more efficient. The query shown in FIG. 5 (and in text below) is an example of such a query that the illustrative embodiment may transform. In FIG. 5, a query 502, QUERY-1, contains a Union operator 505 between a first sub-query 504 and a second sub-query 506, where each sub-query (504 & 506) includes a Group By operation (see 507 & 509) over that sub-query, and where the query 502 includes a Group By operation 508 over both sub-queries. QUERY-1 is also represented below:

```
QUERY-1:
SELECT Q0.A as Customer, Q0.B as ItemCount, Q0.C as
OrderCount, Q0.D as
TotalShipping
FROM
(
SELECT Q1.CUSTOMER AS A, COUNT(*) AS B, SUM(Q2.AMOUNT)
AS C,
SUM(DISTINCT Q1.SHIPPINGCOST) AS D
```

-continued

```
FROM ORDERS AS Q1, ORDERDETAILS AS Q2
WHERE (Q1.ORDERID = Q2.ORDERID)
GROUP BY Q1.CUSTOMER
Union
SELECT Q3.CUSTOMER AS A, COUNT(*) AS B, SUM(Q4.AMOUNT)
AS C,
SUM(DISTINCT Q3.SHIPPINGCOST) AS D FROM ORDERDETAILS
AS Q4,
ORDERS
AS Q3, customers AS Q5
WHERE Q3.CUSTOMER IS NOT NULL AND (Q3.ORDERID =
Q4.ORDERID)
AND (Q3.CUSTOMER = Q5.CUSTOMER)
GROUP BY Q3.CUSTOMER
)
AS Q0 GROUP BY Q0.A, Q0.B, Q0.C, Q0.D;
```

The tables shown in FIGS. 2-3 may be included in DBMS 100 for maintaining information for, illustratively, a sales business. In this case, DBMS 100 includes information about orders, customers, sales, and so on. A user may draft QUERY-1 to obtain information about orders, and to match that information to customers. However, QUERY-1 is inefficient for at least the following reasons. First, QUERY-1 performs the join operations in the first sub-query 504 and second sub-query 506 twice. Also, first sub-query 504 computes the algebraic aggregate functions twice over the tables Orders and OrderDetails. Finally, Query Q1 requires duplicative accesses to the tables Orders and OrderDetails. Because join operations, algebraic aggregate functions, table accesses are expensive in terms of computing time and resources, an efficient DBMS should minimize them.

Some embodiments of the inventive subject matter can transform QUERY-1 into QUERY-2, where QUERY-1 and QUERY-2 produce the same results. QUERY-2 is shown below:

```
QUERY-2:
SELECT Q0.A as Customer, Q0.B as ItemCount, Q0.C as
OrderCount, Q0.D as
TotalShipping
FROM
(
SELECT Q3.CUSTOMER AS A, COUNT(*) AS B, SUM(Q4.AMOUNT)
AS C,
SUM(DISTINCT Q3.SHIPPINGCOST) AS D FROM ORDERDETAILS
AS Q4,
ORDERS
AS Q3, customers AS Q5
WHERE Q3.CUSTOMER IS NOT NULL AND (Q3.ORDERID =
Q4.ORDERID)
AND (Q3.CUSTOMER = Q5.CUSTOMER)
GROUP BY Q3.CUSTOMER
)
AS Q0 GROUP BY Q0.A, Q0.B, Q0.C, Q0.D;
```

Because the join operation between the sub-queries is a lossless join, the transformation is correct. The results of QUERY-1 and QUERY-2 are identical. FIG. 6 shows results for QUERY-1 and QUERY2. For a lossless join, each row from the first sub-query 504 matches one and only one row from the second sub-query 506. The Union operation (see 505) may be eliminated because: 1) the result of QUERY-1 does not use any result from the first sub-query 504, and 2) the result of QUERY-1 does not use any result from the first sub-query 504 and the Union operation 505.

Figure 7:
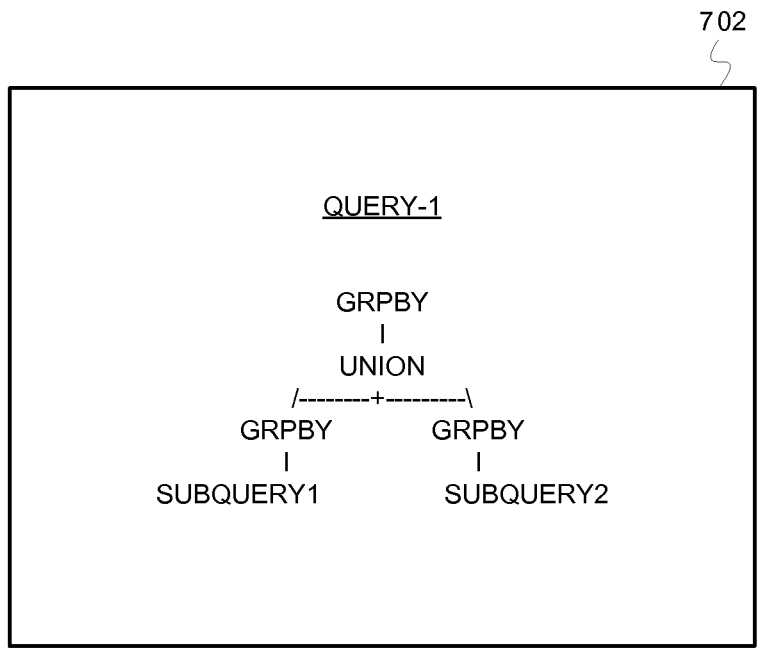
FIG. 7 shows an organization of QUERY-1.
Figure 8:
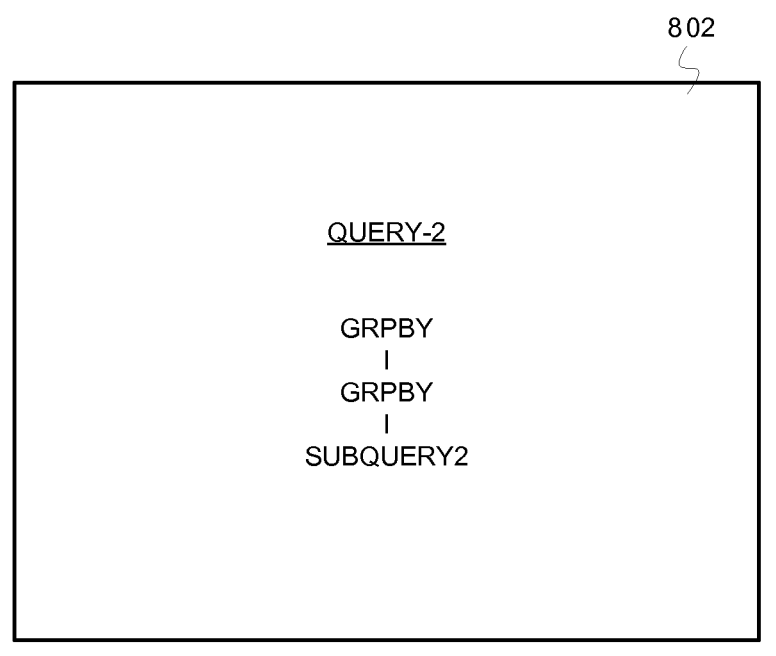

FIG. 7 shows an organization of QUERY-1. FIG. 8 shows an organization of QUERY-2. As noted above, QUERY-2 is a transformed version of QUERY-1, where both QUERY-1 and QUERY-2 produce the same results. Some embodiments transform queries based on the following. If a database statement contains a Union operator between a first sub-query and a second sub-query, where each of the sub-queries includes a Group By operation, and where the query includes a Group By operation over both sub-queries (see FIG. 7), the Union operation may be eliminated if the following conditions are true:

(1) The first sub-query should match the second sub-query exactly. More specifically, each row from the first sub-query should match one row and only one row from the second sub-query.
(2) The Group by partitioning columns should be the same in both sub-queries.
(3) The Group by partitioning columns in the output for the Select operation should contain at least the same Group by partitioning columns from the second sub-query;
(4) Both sub-queries should reference the same columns and use the same algebraic aggregate functions for a specific column.
(5) Output for the Select operation does not refer to any columns from the first sub-query's Group By output.
(6) The Group By and first sub-query are not referenced elsewhere in the query.

FIG. 9 shows QUERY-1 as originally written, and after optimized by a query optimizer. The original code is in code block 902, whereas the optimized code resides in code block 904. Even after optimization, the code block 904 still includes the inefficiencies noted above. FIG. 10 shows QUERY-2, which is a transformation of QUERY-1. The transformation removes the Union operation and other inefficiencies. Code block 1004 shows QUERY-4 after optimization by a query optimizer. QUERY-2 is more efficient than QUERY-1.

In some embodiments, conditions (1) and (5) may be relaxed. Some embodiments use techniques to match sub-queries. Such techniques can be used, for example, when matching queries with materialized views. Queries are not only matched as exact matches, but can be matched to detect whether a sub-query subsumes another. The result of these techniques is to separate the common portion of the two sub-queries and formulate the compensation over the common portion to obtain the original sub-query.

In some instances, a query's first and second sub-queries do not match. Despite this, some embodiments can nevertheless transform the query into a more efficient form. In the case where the first and second sub-queries do not exactly match, if the second sub-query subsumes the first sub-query, Union elimination may still be performed. In the following examples, queries QUERY-3 and QUERY-4 do not have matching first and second sub-queries. Embodiments can transform QUERY-3 and QUERY-4 into a more efficient query.

QUERY-3 is shown below.

```
QUERY-3:
SELECT Q0.A as Customer, Q0.B as ItemCount, Q0.C as
OrderCount, Q0.D as TotalShipping
FROM
(
SELECT Q1.CUSTOMER AS A, COUNT(*) AS B, SUM(Q2.AMOUNT)
AS C,
SUM(DISTINCT Q1.SHIPPINGCOST) AS D
FROM ORDERS AS Q1, ORDERDETAILS AS Q2
WHERE (Q1.ORDERID = Q2.ORDERID) AND
Q1.CUSTOMER ='ABC'
GROUP BY Q1.CUSTOMER
```

-continued

```
UNION
SELECT Q3.CUSTOMER AS A, COUNT(*) AS B, SUM(Q4.AMOUNT)
AS C,
SUM(DISTINCT Q3.SHIPPINGCOST) AS D FROM ORDERDETAILS
AS Q4,
ORDERS
AS Q3, customers AS Q5
WHERE Q3.CUSTOMER IS NOT NULL AND (Q3.ORDERID =
Q4.ORDERID)
AND (Q3.CUSTOMER = Q5.CUSTOMER)
GROUP BY Q3.CUSTOMER
)
AS Q0 GROUP BY Q0.A, Q0.B, Q0.C, Q0.D;
```

In QUERY-3, the second sub-query covers all customers, while the first sub-query covers only the customers with customer="ABC". QUERY-4 (shown below) is another example of query that may be transformed by some embodiments of the inventive subject matter.

```
QUERY-4:
SELECT Q0.A as Customer, Q0.B as ItemCount, Q0.C as
OrderCount, Q0.D as
TotalShipping
FROM
(
SELECT Q1.CUSTOMER AS A, COUNT(*) AS B, SUM(Q2.AMOUNT)
AS C,
SUM(DISTINCT Q1.SHIPPINGCOST) AS D
FROM ORDERS AS Q1, ORDERDETAILS AS Q2
WHERE (Q1.ORDERID = Q2.ORDERID)
GROUP BY Q1.CUSTOMER HAVING SUM(Q2.AMOUNT) > 400
UNION
SELECT Q3.CUSTOMER AS A, COUNT(*) AS B, SUM(Q4.AMOUNT)
AS C,
SUM(DISTINCT Q3.SHIPPINGCOST) AS D FROM ORDERDETAILS
AS Q4,
ORDERS
AS Q3, customers AS Q5
WHERE Q3.CUSTOMER IS NOT NULL AND (Q3.ORDERID =
Q4.ORDERID)
AND (Q3.CUSTOMER = Q5.CUSTOMER)
GROUP BY Q3.CUSTOMER
)
AS Q0 GROUP BY Q0.A, Q0.B, Q0.C, Q0.D;
```

Some embodiments can transform queries QUERY-3 and QUERY-4 into a more efficient query. QUERY-5 (shown below) represents a transformation of QUERY-3 and QUERY-4.

```
QUERY-5:
SELECT Q0.A as Customer, Q0.B as ItemCount, Q0.C as
    OrderCount, Q0.D as
Total Shipping
FROM
(
    SELECT Q3.CUSTOMER AS A, COUNT(*) AS B,
        SUM(Q4.AMOUNT) AS C,
SUM(DISTINCT Q3.SHIPPINGCOST) AS D FROM ORDERDETAILS
AS Q4,
    ORDERS AS Q3, customers AS Q5
WHERE Q3.CUSTOMER IS NOT NULL AND (Q3.ORDERID =
    Q4.ORDERID)
AND (Q3.CUSTOMER = Q5.CUSTOMER)
GROUP BY Q3.CUSTOMER
)
AS Q0 GROUP BY Q0.A, Q0.B, Q0.C, Q0.D;
```

As noted above, both QUERY-3 and QUERY-4 can be transformed to QUERY-5. To achieve the transformation to QUERY-5, the following should be true of QUERY-3 and QUERY-4:
(1) The second sub-query subsumes the first sub-query.
(2) The Group By partitioning columns are the same in first and second sub-queries.
(3) The Group By partitioning columns in the output of the Select operation contains at least the same Group By partitioning columns from the second sub-query.
(4) Both sub-queries reference the same columns and use the same algebraic aggregate functions for a specific column.
(5) The output for the Select operation does not refer to any columns from the first sub-query's Group By output.
(6) The Group By and the first sub-query are not referenced elsewhere in the query.

In some instances, an output query refers to aggregation functions. In such instances, some embodiments can eliminate Union operations from the query. Consider the following example. QUERY-6 is represented below.

```
QUERY-6:
SELECT Q0.A as Customer, MAX(Q0.B) as ItemCount, MAX(Q0.C) as OrderCount,
MAX(Q0.D) as TotalShipping
FROM
(
SELECT Q1.CUSTOMER AS A, COUNT(*) AS B, SUM(Q2.AMOUNT) AS C,
SUM(DISTINCT Q1.SHIPPINGCOST) AS D
FROM ORDERS AS Q1, ORDERDETAILS AS Q2
WHERE (Q1.ORDERID = Q2.ORDERID) AND
Q1.CUSTOMER ='ABC'
GROUP BY Q1.CUSTOMER
UNION
SELECT Q3.CUSTOMER AS A, COUNT(*) AS B, SUM(Q4.AMOUNT) AS C,
SUM(DISTINCT Q3.SHIPPINGCOST) AS D FROM ORDERDETAILS AS Q4,
ORDERS
AS Q3, customers AS Q5
WHERE Q3.CUSTOMER IS NOT NULL AND (Q3.ORDERID = Q4.ORDERID)
AND (Q3.CUSTOMER = Q5.CUSTOMER)
GROUP BY Q3.CUSTOMER
)
AS Q0 GROUP BY Q0.A;
```

Some embodiments can transform QUERY-6 into QUERY-7, a more efficient query. QUERY-7 is represented below:

```
QUERY-7:
SELECT Q0.A as Customer, MAX(Q0.B) as ItemCount, MAX(Q0.C) as OrderCount,
MAX(Q0.D) as TotalShipping
FROM
(
SELECT Q3.CUSTOMER AS A, COUNT(*) AS B, SUM(Q4.AMOUNT) AS C,
SUM(DISTINCT Q3.SHIPPINGCOST) AS D FROM ORDERDETAILS AS Q4,
ORDERS
AS Q3, customers AS Q5
WHERE Q3.CUSTOMER IS NOT NULL AND (Q3.ORDERID = Q4.ORDERID)
AND (Q3.CUSTOMER = Q5.CUSTOMER)
Main Idea for Disclosure GB8-2010-0624 - continued
Page 15 Printed 04/27/2011 at 02:11:14 PM
GROUP BY Q3.CUSTOMER
)
AS Q0 GROUP BY Q0.A;
```

As noted above, some embodiments transform QUERY-6 into QUERY-7. To achieve the transformation, the following should be true of QUERY-7:
(1) The second sub-query subsumes the first sub-query. That is, the result-set of the second sub-query contains the result-set of the first sub-query. In other words, the results of the first sub-query are included in the results of the second sub-query.
(2) The Group By partitioning columns are the same in first and second sub-queries.
(3) The Group By partitioning columns in the output of the Select operation contains at least the same Group By partitioning columns from the second sub-query. For example, in QUERY-6, the column(s) "Q3.CUSTOMER" from the "GROUP BY Q3.CUSTOMER" should exist in the column(s) list "Q0.A" from the "Q0 GROUP BY Q0.A". In some instances, the Group By columns ("Q3.CUSTOMER") from the second sub-query could be different than what is in QUERY-6. For example, if the Group By columns of the second sub-query are Q3.CUSTOMER, Q3.SHIPPINGCOST, then for this invention to work, the Group By columns from the Select output should contain those same columns. The Group By columns can be different, so long as the second query's Group By columns are contained in the output of the select operation.
(4) Both sub-queries reference the same columns and use the same algebraic aggregate functions for a specific column.
(5) The output for the Select operation does not refer to any columns from the first sub-query's Group By output. In QUERY-6, the following Select operation: "SELECT Q0.A as Customer, MAX(Q0.B) as ItemCount, MAX (Q0.C) as OrderCount, MAX(Q0.D) as TotalShipping" does not refer to any columns in the first sub-query's select columns: SELECT Q1.CUSTOMER AS A, COUNT(*) AS B, SUM(Q2.AMOUNT) AS C, SUM(DISTINCT Q1.SHIPPINGCOST) AS D.
(6) The Group By of the first sub-query are not referenced elsewhere in the query. For example is, columns of the first sub-query's Group By (i.e., Q1.CUSTOMER) are not being referenced and used in the query.

More Example System Components

Figure 11:
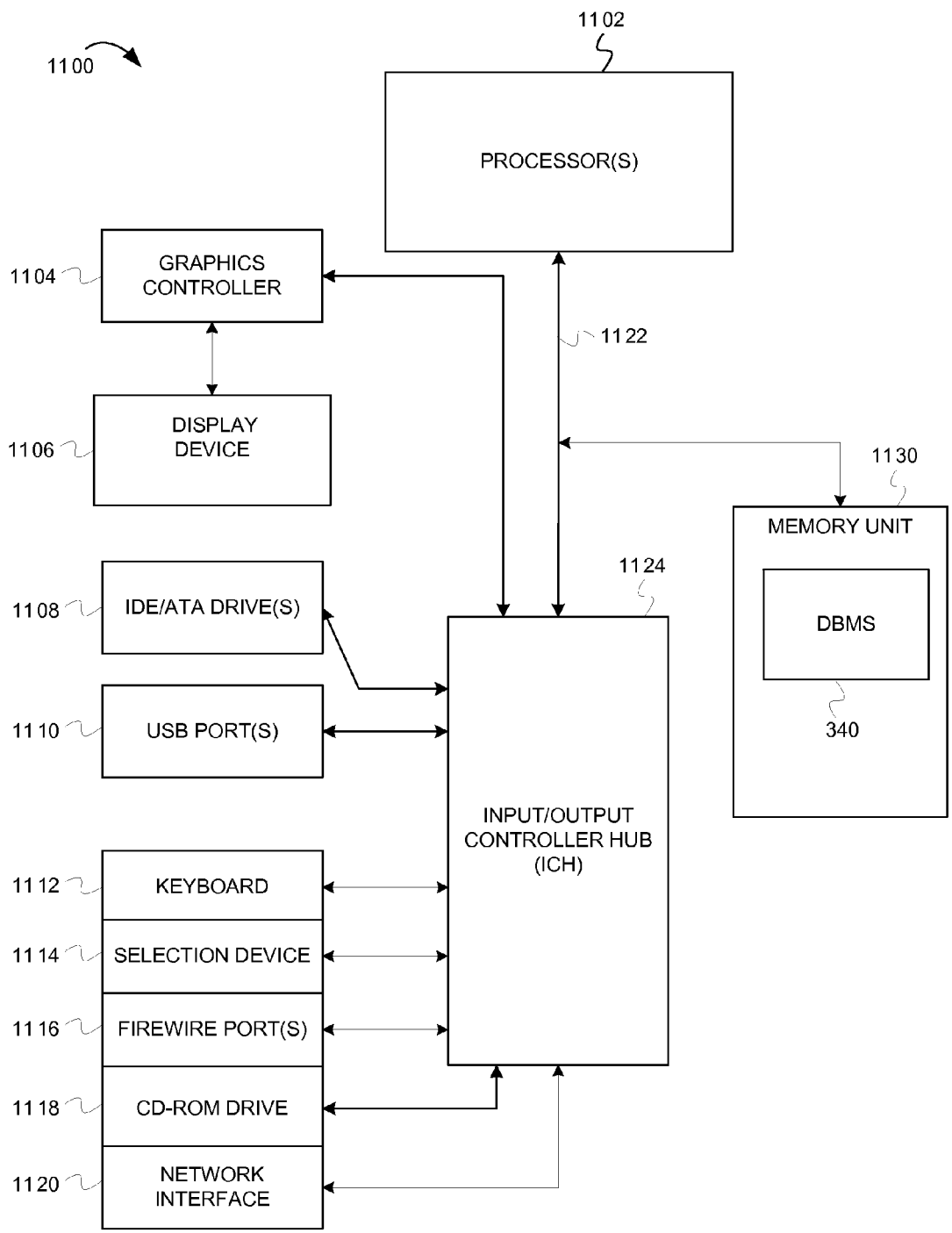
FIG. 11 depicts an example computer system, according to some embodiments.

FIG. 11 depicts an example computer system, according to some embodiments. A computer system includes a processor unit 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a bus 1103 (e.g., PCI, ISA, PCI-Express, HyperTransport®, InfiniBand®, NuBus, etc.), a network interface 1105 (e.g., an ATM interface, an Ethernet interface, a Frame Relay interface, SONET interface, wireless interface, etc.), and a storage device(s) 1109 (e.g., optical storage, magnetic storage, etc.). The system memory 1107 embodies functionality to implement embodiments described above. For example, the system memory 1107 includes DBMS 342, which can transform database queries, as described above. For example, in some instances, the DBMS 342 eliminates Union operations from queries, as described above. In some embodiments, the DBMS 342 includes components similar to those shown in FIG. 2. The DBMS 342 can include code that executes on the processing unit 1101 and other components of the computer system. In some instances, the DBMS 342 does not reside entirely in the memory 1107. For example, the DBMS 342 may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101.

While the embodiments are described with reference to various implementations and exploitations, it will be understood that these embodiments are illustrative and that the scope of the inventive subject matter is not limited to them. In general, techniques for processing database queries, as described herein, may be implemented with facilities consistent with any hardware system or hardware systems. Many variations, modifications, additions, and improvements are possible.

Additional Operations

This section will discuss additional operations for processing database queries, according to some embodiments of the inventive subject matter.

Figure 12:
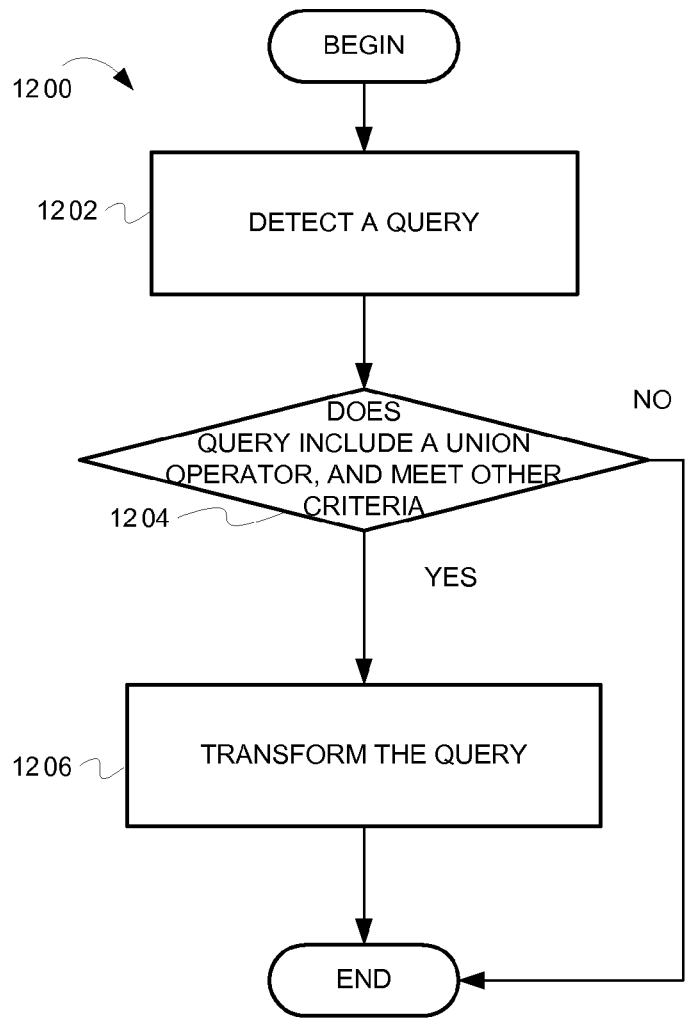
FIG. 12 is a flow diagram illustrating operations for transforming database queries, according to some embodiments of the inventive subject matter.

FIG. 12 is a flow diagram illustrating operations for transforming database queries, according to some embodiments of the inventive subject matter. In FIG. 12, a flow 1200 begins at block 1202, where a DBMS's query optimization unit detects a database query. In some embodiments, the database query is formatted as a SQL query. The flow continues at block 1204.

At block 1204, the query optimizer determines whether the query includes a Union operator, and meets other criteria. For example, if the optimizer receives QUERY-1 (see above), the query optimizer recognizes that the query includes a Union operator. Furthermore, the query optimizer determines whether the query meets other criteria, such as if the Union operator between a first sub-query and a second sub-query, where each of the sub-queries includes a Group By operation, and where the query includes a Group By operation over both sub-queries (see FIG. 7). In some embodiments, the query optimizer may also check the following:
(1) The first sub-query should match the second sub-query exactly. More specifically, each row from the first sub-query should match one row and only one row from the second sub-query.
(2) The Group by partitioning columns should be the same in both sub-queries.
(3) The Group by partitioning columns in the output for the Select operation should contain at least the same Group by partitioning columns from the second sub-query;
(4) Both sub-queries should reference the same columns and use the same algebraic aggregate functions for a specific column.
(5) Output for the Select operation does not refer to any columns from the first sub-query's Group By output.
(6) The Group By and first sub-query are not referenced elsewhere in the query.
If the criteria are met, the flow would continue at block 1206. Otherwise, the flow ends.

At block 1206, the query optimizer transforms the query. For example, the query optimizer can transform queries to eliminate Union operator, redundant table accesses, and other inefficiencies. As described above vis-à-vis QUERY-1, the query optimizer can transform QUERY-1 into QUERY-2, where QUERY-2 does not include the Union operation and redundant table accesses. From block 1206, the flow ends.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The program code can include instructions to perform any of the operations described herein, such as operations for transforming database queries, as described above.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for efficiently transforming a database query comprising:
    detecting a database query; and
    in response to detecting the database query, performing operations including:
    (a) determining that the database query includes a first sub-query and a second sub-query, wherein the first sub-query and second sub-query are operands for a Union operation, wherein a first result of the first sub-query is associated with a first Group By operation, wherein a second result of the second sub-query is associated with a second Group By operation, and wherein a result of the Union operation is associated with a third Group By operation,
    (b) determining that partitioning columns are the same for the first and second Group By operations,
    (c) determining that the first and second sub-queries include identical algebraic functions,
    (d) determining that the first Group By operation and first sub-query are not referenced elsewhere in the query, and transforming the database query into an optimized query, wherein the optimized query does not include the Union operation.

2. The computer-implemented method of claim 1, wherein the optimized query and the database query produce the same results.

3. The computer-implemented method of claim 1, wherein the optimized query and the database query are in structured query language (SQL) format.

4. The computer-implemented method of claim 1, wherein the algebraic functions include one or more of Sum and Count.

5. The computer-implemented method of claim 1, wherein the optimized query requires fewer computing resources to evaluate than does the database query, and the algebraic functions include one or more of sum and count.

6. The computer-implemented method of claim 1, wherein a structured query language (SQL) parser performs the detecting step, a query graph semantics unit performs the determining steps (a) through (d), and a query transformation unit performs the transforming step.

7. A computer-implemented method for transforming database queries to more efficient forms in a computer system, the method comprising:
    detecting a database query, wherein the database query includes a Select operator, and the database query includes a Union operator between a first sub-query and a second sub-query, wherein the first sub-query includes a Group By operation over the first sub-query, and wherein the second sub-query includes a Group By operation over the second sub-query, and wherein the database query includes a Group By operation over both the first and second sub-queries;
    determining that rows of a table in the first sub-query match rows of the table in the second sub-query;
    determining that the first sub-query and the second sub-query reference identical columns of the table and include identical algebraic functions applied to each column of the table;
    determining that the first sub-query and the first sub-query's Group By are not referenced elsewhere in the database query; and
    transforming the database query to an optimized query, wherein the optimized query does not include the Union operator.

8. The computer-implemented method of claim 7, wherein the database query and the optimized query produce the same result.

9. The computer-implemented method of claim 7, wherein the database query is in structured query language (SQL) format.

10. The computer-implemented method of claim 7 further comprising:
    determining that the first sub-query is not referenced elsewhere in the database query.

11. The computer-implemented method of claim 7, wherein the algebraic functions include one or more of sum and count.

12. The computer-implemented method of claim 7, wherein the optimized query requires fewer computing resources to evaluate than does the database query.

13. A computer program product for transforming a database queries, the computer program product comprising:
a non-transitory computer readable storage medium having computer usable program code embodied therewith, the computer usable program code comprising a computer usable program code to:
detect the database query, wherein the database query includes a Select operator, and the database query includes a Union operator between a first sub-query and a second sub-query, wherein the first sub-query includes a Group By operation over the first sub-query, and wherein the second sub-query includes a Group By operation over the second sub-query, and wherein the database query includes a Group By operation over both the first and second sub-queries;
determining that rows of a table in the first sub-query match rows of the table in the second sub-query;
determine that the first sub-query and the second sub-query reference identical columns of the table and include identical algebraic functions applied to each column of the table;
determine that the first sub-query and the first sub-query's Group By are not referenced elsewhere in the database query; and
transform the database query to an optimized query, wherein the optimized query does not include the Union operator.

14. The computer program product of claim 13, wherein the database query and the optimized query produce the same result.

15. The computer program product of claim 13, wherein the database query is in structured query language (SQL) format.

16. The computer program product of claim 13 further comprising:
determining that the first sub-query is not referenced elsewhere in the database query.

17. The computer program product of claim 13, wherein the algebraic functions include one or more of sum and count.

18. The computer program product of claim 13, wherein the optimized query requires fewer computing resources to evaluate than does the database query.

19. An apparatus comprising:
a processor configured to execute instructions for a database management system;
the database management system configured to process database queries, wherein the database management system includes
a query transformation unit configured to
detect a database query, wherein the database query includes a Select operator, and the database query includes a Union operator between a first sub-query and a second sub-query, wherein the first sub-query includes a Group By operation over the first sub-query, and wherein the second sub-query includes a Group By operation over the second sub-query, and wherein the database query includes a Group By operation over both the first and second sub-queries;
determine that rows of a table in the first sub-query match rows of the table in the second sub-query;
determine that the first sub-query and the second sub-query reference identical columns of the table and include identical algebraic functions applied to each column of the table;
determine that the first sub-query and the first sub-query's Group By are not referenced elsewhere in the database query; and
transform the database query to an optimized query, wherein the optimized query does not include the Union operator.

20. The apparatus of claim 19, wherein the optimized query and the structured query language (SQL) query produce the same results.

21. The apparatus of claim 19, wherein the optimized query is in structured query language (SQL) format.

22. The apparatus of claim 19, wherein the algebraic functions include one or more of Sum and Count.

23. The apparatus of claim 19, wherein the optimized query requires fewer computing resources to evaluate than does the database query.

24. The apparatus of claim 19, wherein the optimized query includes a single Group By operation.

25. The apparatus of claim 19, wherein the algebraic functions include one or more of sum and count.

* * * * *